T. E. STRAUS.
COTTON PICKER.
APPLICATION FILED AUG. 29, 1913.

1,174,528.

Patented Mar. 7, 1916.
4 SHEETS—SHEET 1.

Witnesses
H. C. H. Murray
M. E. Shook

Inventor
Theodore E. Straus

By Sturtevant & Husson
Attorneys

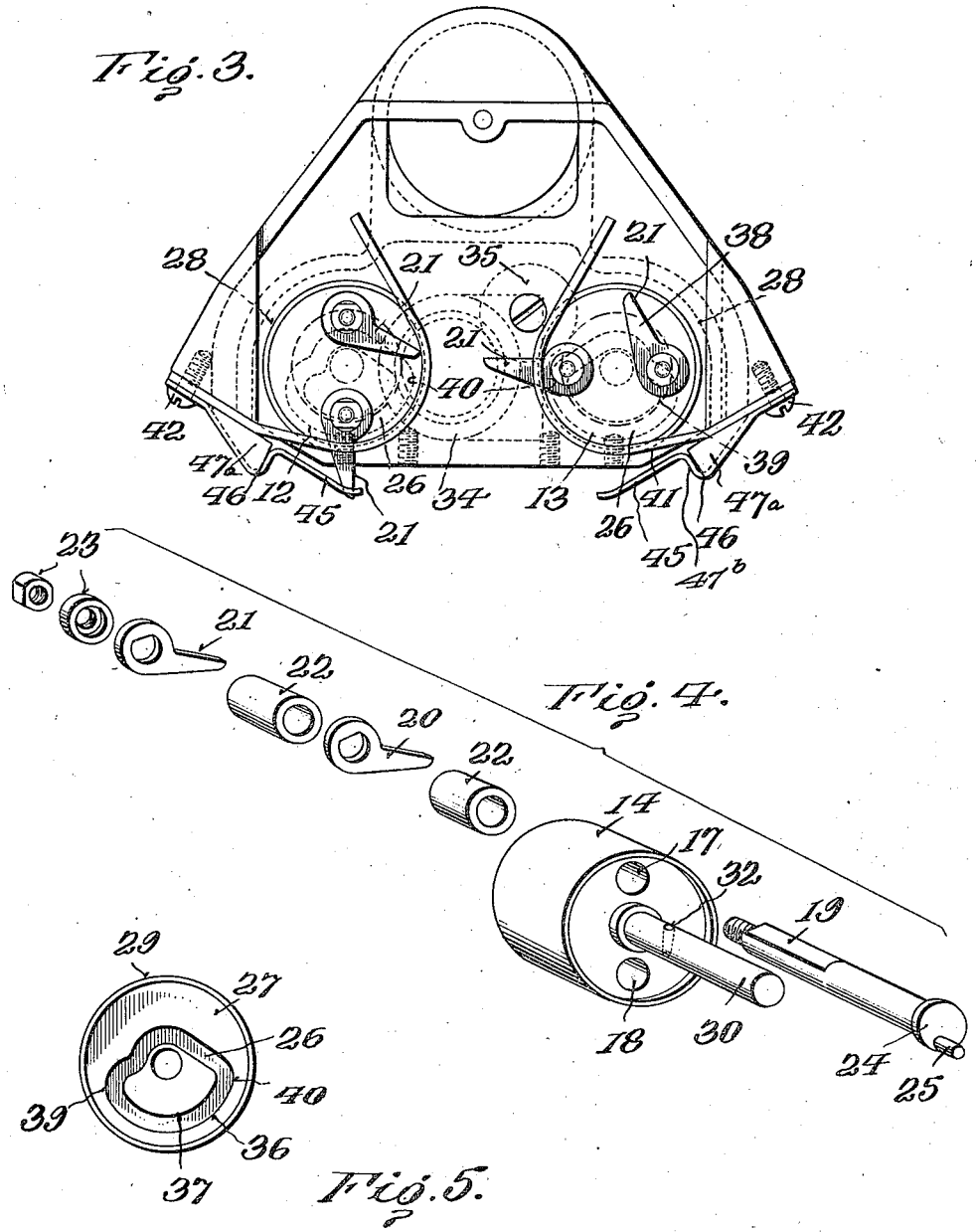

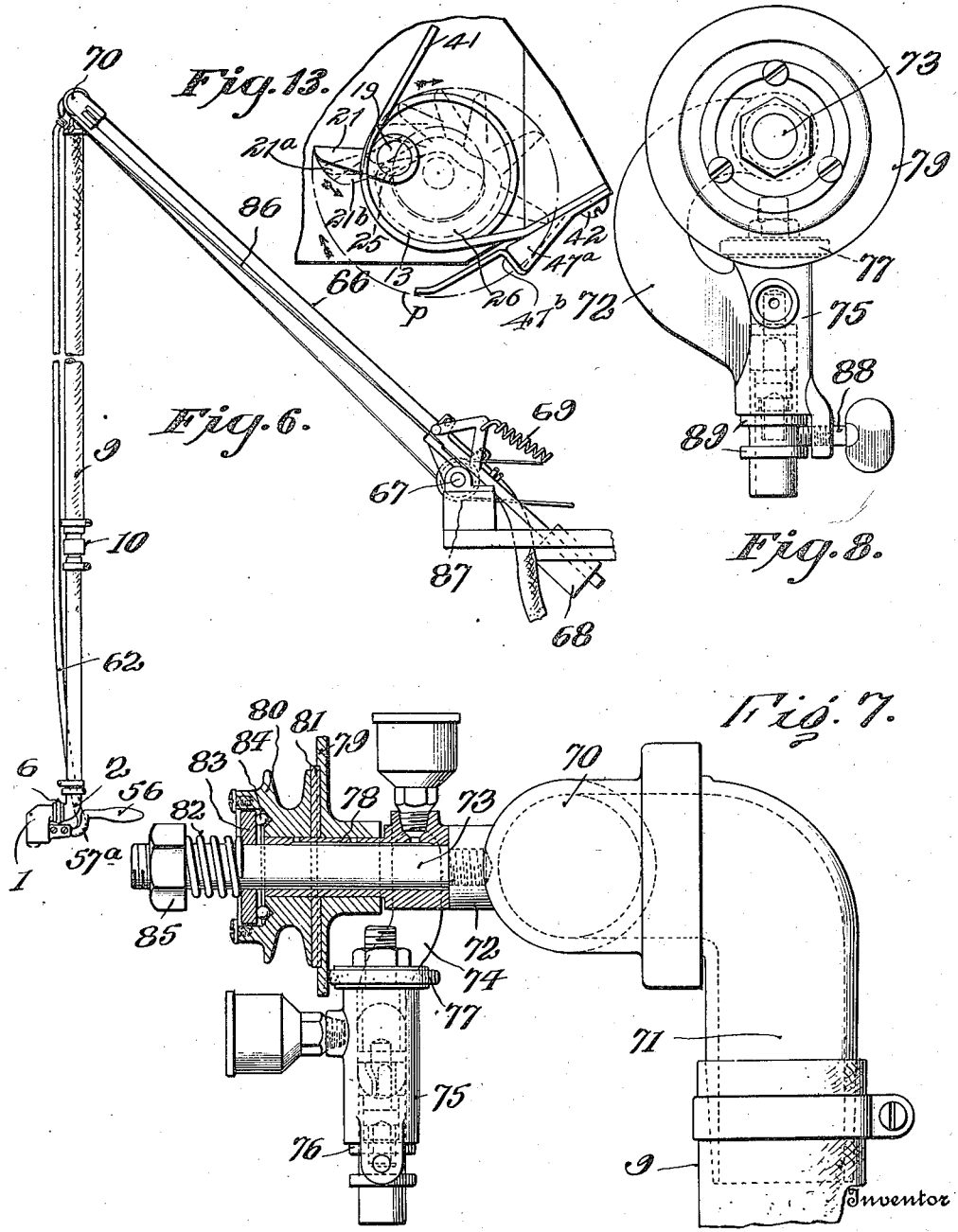

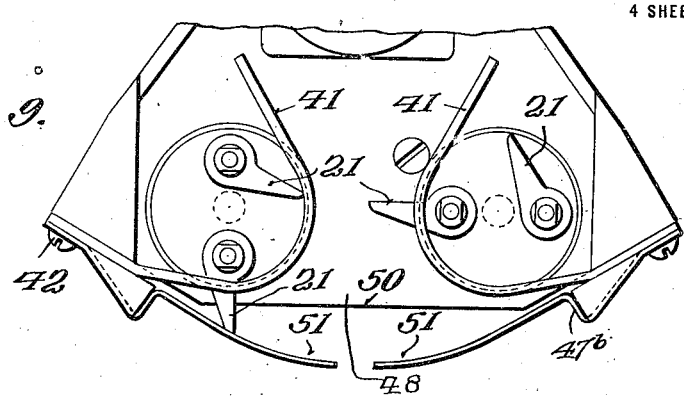
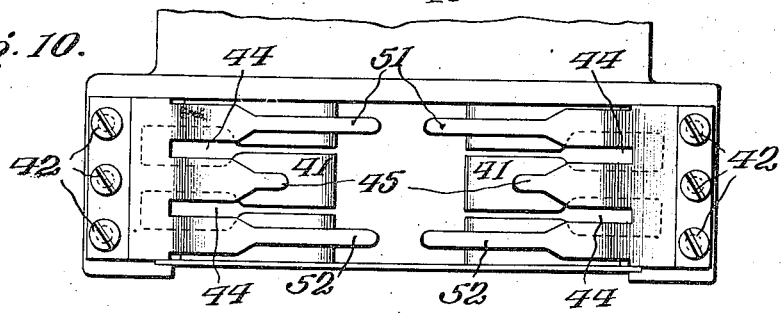
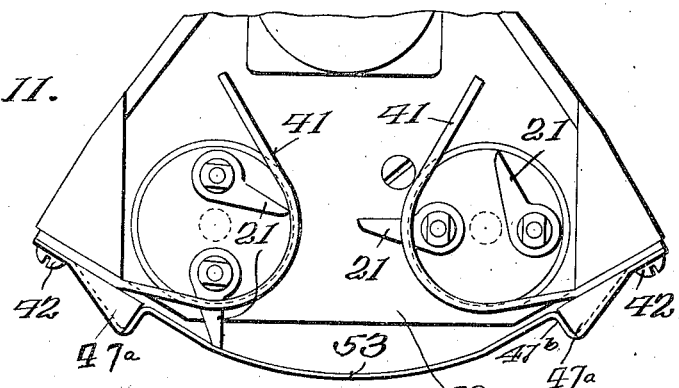
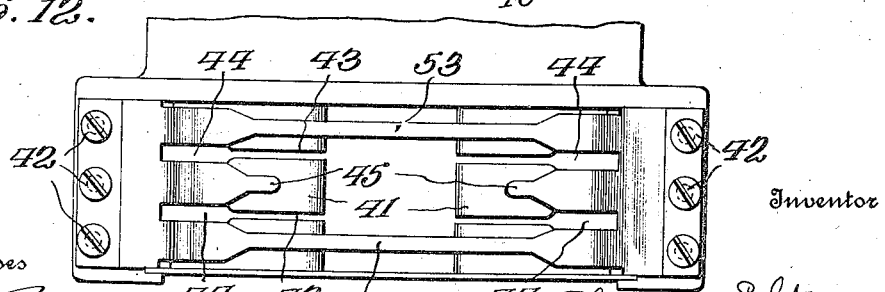

UNITED STATES PATENT OFFICE.

THEODORE E. STRAUS, OF BALTIMORE, MARYLAND, ASSIGNOR TO WORTHINGTON COTTON HARVESTER COMPANY, OF BALTIMORE, MARYLAND, A CORPORATION OF DELAWARE.

COTTON-PICKER.

1,174,528.  Specification of Letters Patent.  Patented Mar. 7, 1916.

Application filed August 29, 1913. Serial No. 787,340.

*To all whom it may concern:*

Be it known that I, THEODORE E. STRAUS, a citizen of the United States, residing at Baltimore, in the State of Maryland, have invented certain new and useful Improvements in Cotton-Pickers, of which the following is a description, reference being had to the accompanying drawing, and to the figures of reference marked thereon.

The invention relates to new and useful improvements in cotton pickers and more particularly to that type of cotton pickers in which the cotton fiber is stripped from the cotton boll and conveyed to the storage receptacle by the combined action of suction and mechanical picking fingers.

An object of the invention is to provide a picking nozzle which is so constructed as to throw out the boll and twigs and other solid parts from the force of suction as to more readily allow the cotton fiber to be separated from said solid portions and conveyed by suction to the storage receptacle.

A further object of the invention is to provide a cotton picking nozzle with mechanical picking fingers which are under positive control as to both their inward and outward movement during the entire rotation of said fingers.

A still further object of the invention is to provide a cotton picking nozzle having mechanical picking fingers which is so constructed as to provide an intake for the air about the picking fingers at the region where said picking fingers first engage the cotton fiber so as to hold the cotton fiber for the fingers to penetrate or otherwise become engaged with the same.

A still further object of the invention is to provide a picking nozzle with a hand supporting device and with a coupling formed in the nozzle between the picking end thereof and the flexible conveyer which permits the picking section of the nozzle to be readily turned by the operator to present said picking head at different angles during the picking operation.

A still further object of the invention is to provide a friction drive for the flexible shaft which is located adjacent the inner end of the flexible conveyer and which is supported by a hanger so that said flexible driving shaft may be maintained in a substantially vertical position for various adjustments of the support for the flexible conveyer.

These and other objects will in part be obvious and will in part be hereinafter more fully described.

Figure 1:
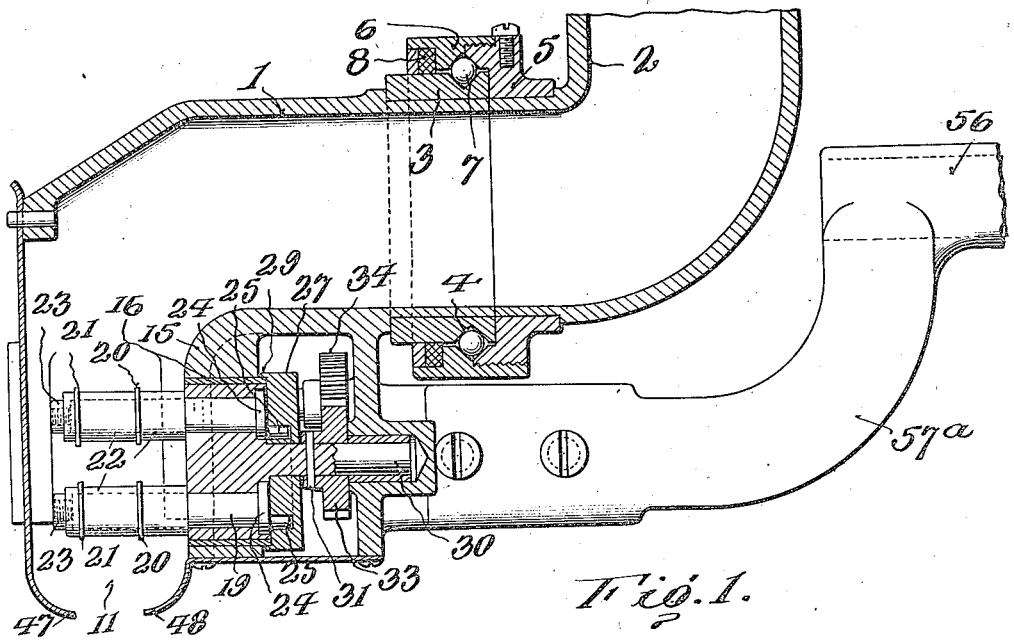
Figure 2:
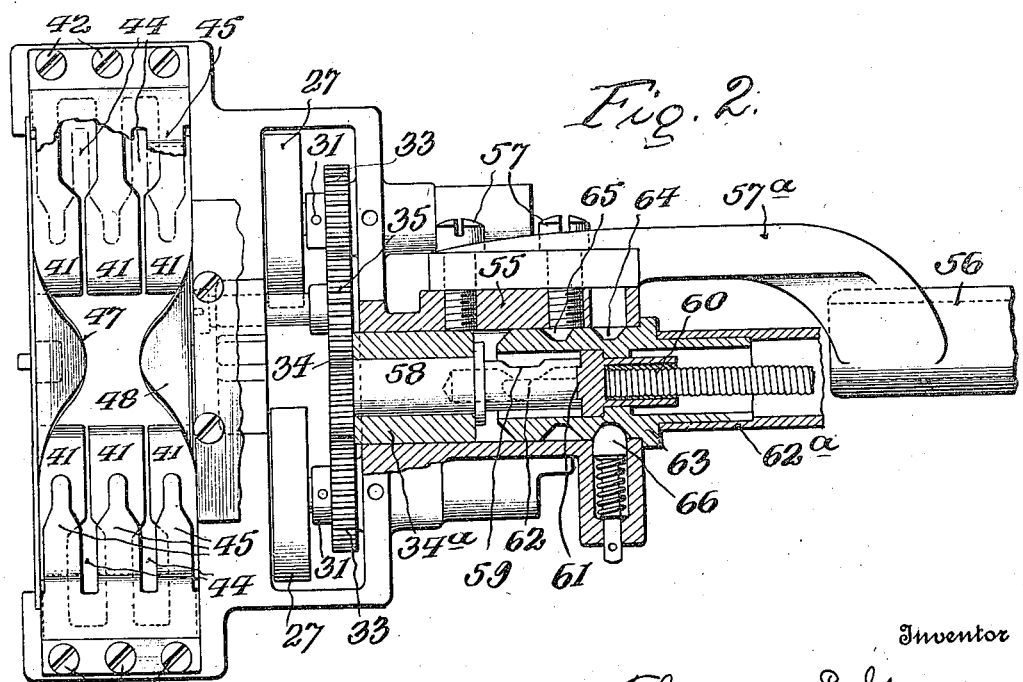

Referring to the drawings, Figure 1 is a longitudinal sectional view through a picking nozzle having my improvements applied thereto. Fig. 2 is in part a horizontal section and in part a bottom plan view of my picking nozzle. Fig. 3 is an end view of the picking nozzle with the front plate removed and showing the picker finger carriers in end elevation. Fig. 4 is a view in perspective showing the parts of the rotating carrier, picking fingers, and supports therefor detached and in relative position to each other. Fig. 5 is an end view of the cam which operates the picking fingers. Fig. 6 is a detail view showing the preferred manner of supporting my improved picking nozzle and the relation of the flexible joint in the nozzle to the flexible joint in the flexible conveyer. Fig. 7 is a detail on an enlarged scale, partly in section and partly in side elevation, showing the supporting hanger and the friction drive for the flexible shaft. Fig. 8 is an end view of the same. Fig. 9 is an end view of a portion of the nozzle with parts removed showing a slightly modified form of the invention. Fig. 10 is a face view of the nozzle shown in Fig. 9. Fig. 11 is a view similar to Fig. 9 showing a slightly further modified form of the invention. Fig. 12 is a face view of the nozzle shown in Fig. 11. Fig. 13 is a view showing in detail the path of travel of the picking finger at the time the cotton fiber is stripped from the finger.

The invention consists, generally, in providing a suction nozzle with rotating mechanical picking fingers which engage the cotton fiber at the picking region and convey the same into the suction passage where it is removed from the picking fingers and conveyed by suction to the storage receptacle. The picking nozzle is also so constructed as to permit an intake of air through the suction at the picking region on all sides of the picking fingers. This inrushing of the air holds the cotton fiber firmly against the picking surface while the mechanical picking fingers are engaging the same. The picking nozzle is further constructed with a central suction portion so that the same is, in effect, divided into three distinct sections so far as the suction is concerned, one at each side where the picking takes place and one in the central part of the nozzle which assists in stripping the cotton fiber from the picking fingers and conveying the same to the storage receptacle. The picking nozzle is also provided with means which carries the bolls, twigs, and other solid parts outward from the nozzle while the cotton fiber is still engaged by the picking fingers, and this outward movement of the solid parts brings the same to a region wherein the suction is less and facilitates the separating of the solid parts from the cotton fiber.

The invention also consists in forming the nozzle in sections which are so joined as to permit the section having the picking head thereon to be readily turned so as to present the same at different angles during the picking of the cotton. This jointed connection in the picking nozzle lies in a plane substantially at right angles to the plane containing a jointed connection in the flexible conveyer which permits of a further angular adjustment of the picking head.

Then again, the invention consists in providing a friction drive for the flexible shaft which is located at the inner end of the flexible conveyer pipe and is so supported by a carrier for the flexible conveyer pipe that said flexible conveyer shaft will maintain a substantially vertical position during all adjustments of the carrier.

Referring more particularly to the drawings, my improved nozzle consists of two sections 1 and 2 which are joined together by a flexible joint consisting of an inner sleeve 3 having a V-shaped ball race 4, an outer sleeve 5, and a collar 6. The collar and sleeve 5 are shaped so as to form a corresponding V-shaped ball race and a series of balls 7 located in the races referred to, join the two sections so as to hold the same assembled and at the same time permit the free turning of one section on the other. A packing joint 8 is also provided to keep the bearing free of dust and lint.

The inner section 2 of the nozzle is connected to the usual flexible conveyer pipe indicated at 9 in Fig. 6 of the drawing. This conveyer pipe is formed in two sections which are connected by a flexible joint 10 similar in construction to the joint connecting the two sections of the nozzle. The outer section 1 of the picking nozzle is formed with a picking mouth 11 which extends transversely across the nozzle in a plane substantially at right angles to the longitudinal axis of the nozzle. This picking mouth is divided into two sections, one at each side of the central part of the nozzle. A rotating carrier 12 is located at one side of the picking mouth and a rotating carrier 13 is located at the other side thereof. These two rotating carriers are similar in construction and the description of one will answer for the other. Each rotating carrier consists of a cylinder 14 which is journaled in the wall 15 of the nozzle. A bearing sleeve 16 provides a bearing support for said cylinder. The cylinder 14, as herein shown, is formed with two openings 17 and 18 through each of which passes a supporting rod or shaft 19 for the picking fingers. Each supporting rod or shaft carries two picking fingers 20 and 21. These picking fingers are held spaced by suitable collars 22 and the fingers are retained on the supporting rod by threaded collars 23. The supporting rod 19 is formed with a flat surface and each finger is provided with a corresponding flat surface so that said picking fingers are fixed on the supporting rods and turn therewith. These supporting rods project from the rotating carrier so as to extend into the mouth of the picking nozzle.

Each supporting rod 19 is formed with a disk 24 which overlies the end of the cylinder and holds the rod therein. Each disk carries a crank pin 25 which is eccentrically set on the disk and coöperates with a cam groove 26 formed in a fixed cam disk 27. This cam disk 27 is held from movement by suitable screws, which pass through the casing into the cam disk. The cam disk is also provided with an annular projecting rib 29 which preferably engages over the inner end of the bearing sleeve 16. The carrier cylinder 14 has a shaft 30 fixed thereto, which shaft extends through the fixed cam disk and a pin 31 is passed through an opening 32 in the shaft 30. This pin serves to hold the parts assembled. In other words, the supporting rods 19 are inserted in the carrier, the picking fingers placed thereon and fixed thereto. The cam disk 27 is placed in the casing and secured therein, after which the shaft 30 is inserted in the central opening through the cam disk and the tapered pin 31 dropped in place through the hub of the driven gears to be hereinafter described. Inasmuch as the cam disk overlies the bearing 16, it is held from outward movement toward the mouth of the picking nozzle and the retaining pin 31 prevents the shaft from being withdrawn through the opening in the cam disk and, therefore, holds the parts assembled.

Keyed to the shaft 30 by the pin 31 is a driven gear 33. This driven gear 33 meshes with a driving gear 34. The driven gear of the carrier 12 meshes directly with the driving gear 34, while the driven gear of the carrier 13 is connected to the driving gear 34 by an intermediate gear 35, all of which is shown in dotted lines in Fig. 3. From this gear connection, the turning of the gear 34 will cause the rotating carriers to rotate in opposite directions.

As above noted, the cam groove 26 operates positively upon the crank pin 25 during all movements of the picking fingers, that is, this cam groove is cut into the cam disk so as to provide opposed cam walls 36 and 37. These cam walls are also so shaped, as clearly shown in Figs. 3 and 5, as to positively move the picking fingers outward away from the axis of the carrier as said picking fingers approach the picking region. The cam walls positively hold the picking fingers extended while in engagement with the cotton fiber and also positively turn the fingers so as to withdraw them through the strippers in a direction to cause the least resistance to the stripping of the cotton fiber therefrom. Referring again to Fig. 3, the picking finger 38 is in idle position and is withdrawn to substantially its maximum inner position. A continued movement of the rotating carrier will bring the crank pin 25 into engagement with the section 39 of the cam 26 and this section of the cam will at once rotate the picking finger so as to bring the same substantially into a radial position relative to the movement of the carrier, and in this position the finger engages the cotton fiber. The concentric portion of the cam positively holds the finger in this position while the cotton fiber is carried forward and while the husk and twigs are thrown outward away from the carrier. As soon as the cotton fiber is brought to the central portion of the suction passage, the fingers are again rotated by the section 40 of the cam 26 so as to cause the fingers to turn back and withdraw through the stripping slots in a direction substantially at right angles to the face of the stripping plates at the point where the stripping takes place. It will, therefore, be seen that these cam walls positively hold the picking fingers in proper position during its rotation. This turning back of the picker fingers as they are withdrawn through the slots between the strippers is of very great importance and, therefore, the movement of one of the fingers will be described more in detail with special reference to Fig. 13. In this figure of the drawings I have shown in dotted lines the movement of the picking finger, and in broken lines $p$, the path of travel of the extreme point of the picking finger, the arrows indicating the direction of movement. The picking finger 21 in this figure has carried the cotton fiber into the intake passage to a point where the fiber will be carried direct into the conveyer pipe by the suction. This is the extreme advance movement of the picking finger while in engagement with the cotton fiber. The pin 25 which engages the cam groove 26 has reached the end of the concentric portion thereof and a further bodily movement of the picking finger will cause said pin 25 to strike the eccentric wall of the cam groove 26, which will change the direction of movement of the pin 25 and retard the same for a time, which causes the picking finger at its outer end to swing in a backward direction, first, to the position shown at $21^a$ and thence to the position shown at $21^b$, after which the picker finger passes between or beneath the strippers 41 and takes up the succeeding positions shown in dotted lines in Fig. 13 of the drawings. The point of the picker finger follows the path $p$ indicated therein. It will, therefore, be seen that the picking finger, after reaching this advanced position shown in full lines in Fig. 13 is actually moved backward at that portion thereof which engages the cotton fiber, although the supporting rod for the picker finger is continuously moving forward. This backward movement of the picker finger also takes place before the finger is moved laterally relative to the strippers 41. The cotton fiber is held by the suction and by the friction of the stripper members 41 from backward movement, and this backward movement of the stripper finger carries the front faces of the finger out of engagement with the cotton fiber, pressing the back curved face of the finger against the fiber. After the finger is released from the cotton fiber at its picking face, then it is laterally withdrawn through the strippers 41 and the cotton fiber stripped from the curved back of the picking finger.

The front face of the picking finger is properly shaped so as to engage the cotton fiber and carry it along with the movement of the finger into the intake passage. Inasmuch as the fiber is removed from this picking face by a bodily backward swinging of the finger as distinguished from a lateral drawing movement of the finger, said front face may be shaped so as to firmly grip and hold the fiber as it is carried forward into the intake passage.

Heretofore the cotton fiber has been stripped from the picking fingers by a lateral movement of the picking finger between the stripping members. This lateral movement of the picking fingers carries more or less of the cotton fiber in rear of the stripper, which soon clogs the picker. By my improved operating cam, which swings the finger backward out of engagement with the cotton fiber before it is drawn laterally, this objection is overcome.

Coöperating with the picking fingers at the side of the picking nozzle are stripping plates 41. These stripping plates are secured to the nozzle by suitable screws 42 and said plates extend around the carrier and at their free ends are inclined slightly outward from the central plane of the nozzle. These stripper plates are provided with slots 43 through which the picking fingers pass during the rotation of the same. The slots 43 are enlarged, as at 44, so as to form enlarged suction openings which permit free access of air at the picking region on all sides of the picking fingers. These enlarged suction openings *per se* form no part of my present invention but are shown described and claimed in an application filed December 4, 1911, jointly by myself and Bruce Worthington, Serial No. 663,745. Also cooperating with the picking fingers are the stripping fingers 45. These stripping fingers are secured to the nozzle by the screws 42 and said stripping fingers extend toward the central plane of the nozzle and are inclined outwardly so as to provide an outwardly extending tapered or inclined surface against which the husk and twigs engage. These outwardly inclined or tapered surfaces move these solid parts outward as the picking fingers carry the cotton fiber forward toward the center of the picking nozzle.

The stripping fingers 45 are bent outwardly, as at 46, so as to form a space underneath the same which allows a free intake of air at this region in the picking nozzle. The sides of the plates forming the fingers 45 are turned down to form side pieces 47ª which substantially close the space directly beneath the side edges of these plates and cause the suction to pass through the stripper fingers and underneath the same from the center of the nozzle. By this shaping of the stripping fingers, together with the enlarged openings 44, I have provided a picking nozzle wherein the suction is, in effect, divided into three sections, one region of excessive suction being where the fingers on one carrier engage the cotton fiber, another region of excessive suction being where the fingers of the other carrier engage the cotton fiber and the third region of excessive suction being the central portion of the picking nozzle. It will be understood, of course, that the suction decreases as the distance from the nozzle increases. Therefore, the stripping fingers 45 which engage the solid portions will move said solid portions outward to a region of less suction so that at the point where the cotton fiber is stripped from the solid portions, the suction is less and, therefore, there is less liability of carrying the solid portions by suction into the intake passage. Then again, the degree of suction, where the picking fingers are leaving the stripping fingers is less as this region is intermediate the central section where the suction is excessive, and the picking region where the suction is also greater and, therefore, these stripping fingers carry the solid portions to this region where the suction is less and where the fiber may be more readily separated and carried away from said solid portions.

The stripper fingers 45, as clearly shown in the drawings, are bent inwardly at 47ᵇ. This bent in portion is intermediate the ends of the enlarged slots 44. The slots or spaces between the fingers extend slightly to the rear of this bent in portion so there is a suction force acting between the fingers to hold the cotton fiber against the fingers at this point. The purpose of this inwardly bent portion is to provide a protecting covering for the picking fingers when the same first project beyond the face of the nozzle, so that these fingers when they engage the cotton fiber will be moving in a direction toward the center of the nozzle, that is, in the general direction of movement of the fingers when carrying the cotton fiber into the intake passage. This prevents the fingers from striking the bolls or twigs and knocking the same away, as would be liable if the fingers are moving directly outward when passing beyond the face of the nozzle.

In Figs. 1 and 2 of the drawings, I have also provided stripping plates 47 and 48. The stripping plate 47 is formed as a part of the end wall of the nozzle and the outer edges of this plate are inclined to each other forming a central outward projecting portion similar to the stripping fingers 45. The same is true of the plate 48. These plates 47 and 48 are also preferably bent inwardly at the center of the nozzle, as clearly shown in Fig. 2. In Figs. 9 and 10 of the drawings, I have shown these plates 47 and 48 as terminating on the line 50 and the outer stripping fingers 51 and 52 are extended beyond the end of the central stripping finger 45. The ends 51 and 52 of these outer stripping fingers serve in a measure the function of the plates 47 and 48. They prevent the entire cotton boll from being withdrawn into the central suction passage of the nozzle and they also assist in stripping the solid portions from the cotton fiber. In this form of nozzle there is a free intake passage for the air underneath the stripping fingers 51 and 52 and, therefore, the suction at the region of stripping the solid portions from the cotton fiber is even less, for the solid portions are carried out away from the nozzle proper by the stripping fingers and air is free to rush in at the sides into the nozzle.

In Figs. 11 and 12, I have shown a slightly further modified form of the invention wherein the outer stripping fingers 53 and 54 are extended and connected together. These stripping fingers operate in precisely the same manner as the stripping fingers 51 and 52. The picking section 1 of the nozzle has an upwardly extending sleeve 55 to which is rigidly attached a handle 56 by suitable bolts 57. The shank of the handle 57ª is bent so that the longitudinal axis of the handle 56 is substantially in line with the longitudinal axis of the main suction passage of the picking nozzle and also substantially perpendicular to the plane of the flexible joint connecting the sections of the picker nozzle. It will be readily seen, therefore, that by this handle the outer section of the picking nozzle may be readily turned relative to the inner section so as to present said picking mouth of the nozzle at various angles. It will also be readily seen that the lower section of the flexible pipe may through this handle be readily turned about the connecting joint 10. The connecting joint 10 is also at right angles to the joint in the picking nozzle and, therefore, by the aid of the handle said picking mouth may be turned readily in any desired direction. In other words, these two joints located in the manner described form in substance a universal joint connection for the picking head of the picking nozzle.

The gear 34 has a short shaft 58 extending into the projecting sleeve 55 formed on the casing, and the outer end of said shaft is in the form of a sleeve with a flattened section 59. A short bearing 34ª located in said projecting sleeve serves as a journal for said shaft 58. The flexible shaft 60 is provided with a connecting stem 61 which also has a flattened section 62. The flexible shaft 60 is located in a flexible casing 62ª. This flexible casing 62ª is connected to a coupling 63 which forms a bearing for the end of the flexible shaft 60. The coupling 63 is provided with an annular groove 64 and a second annular groove 65. A spring pressed lug 66 is adapted to engage said annular grooves. When the coupling is forced to the position shown in Fig. 2, the spring pressed lug 66 will hold said coupling in this position. When the coupling is in this position, then the stem 61 is moved so that the flat section thereof engages the flat section 59 of the sleeve on the end of the shaft carrying the gear 34 and, therefore, the gear will be rotated with the flexible shaft. If the coupling is withdrawn from the sleeve 55 so as to permit the lug to snap into and engage the annular groove 65, the flat section on the stem will have moved out of contact with the flat section 59 on the sleeve connected to the gear and, therefore, the flexible shaft will turn without turning the gear. This coupling may be easily manipulated so as to stop the rotation of the picking fingers without stopping the movement of the flexible shaft and also without entirely disconnecting the coupling from the nozzle. The two parts may be also readily connected together by a movement of the coupling in the opposite direction.

It will be apparent from the above description that I have provided positively actuated picking fingers and a positive connection between the flexible shaft and the rotating carrier for said picking fingers. There are times in the operation of the picking fingers when the fingers may become locked by solid parts and I have, therefore, provided a frictional or slip drive for the flexible shaft. In Fig. 6 of the drawings I have shown the flexible pipe 9 supported by a rigid conveyer pipe 66. This rigid conveyer pipe is pivotally supported at 67 on a carrier and said rigid pipe is counterbalanced by a suitable weight 68 and spring 69 so that the same may be easily turned about the pivotal support therefor. The upper end of the rigid pipe carries a supporting head 70. This supporting head has a downwardly extending sleeve 71 which carries the flexible pipe 9. Also projecting laterally from the supporting head 70 is a lug 72 into which is threaded a supporting rod 73. A hanger 74 is loosely mounted on said rod 73. This hanger 74 carries a bearing 75 in which is journaled a shaft or coupling 76. The shaft carries a fiber wheel 77. This coupling is made separable in a manner similar to that described in connection with the coupling between the flexible shaft and the gear 34. I have indicated the same in dotted lines in Fig. 7, but further description thereof is not thought necessary. The hanger 74 has a bearing sleeve 78 on which is loosely journaled a metal wheel 79. A pulley 80 is also journaled on said sleeve and a fiber friction bearing 81 is interposed between the metal wall 79 and the pulley 80. This metal wheel 79 is capable of longitudinal movement on said supporting sleeve. A spring 82, encircling the supporting rod 73, bears against a plate 83 which rests against balls 84 running in a ball race in the pulley 80. A nut 85 serves as an abutment for the spring and may be adjusted to vary the tension of the spring. This spring 82 forces the pulley 80 and the fiber friction surface 81 against the metal pulley 79 and also forces said metal pulley 79 against the fiber wheel 77. This forms a frictional driving connection between the pulley 80 and the flexible shaft. The pulley 80 is driven by a suitable belt 86 from a belt wheel 87 which may in turn be driven in any suitable way.

From the above construction, it will be apparent that I have provided a frictional driving connection for the flexible shaft which will slip or yield, provided the picking fingers become locked in any way. Furthermore, it will be apparent that the hanger 74 is loosely mounted on the supporting rod 73 and when the rigid carrying pipe 66 is raised or lowered by the turning of the same about its supporting pivot, said hanger will maintain a substantially vertical position through the action of gravity thereon and, therefore, the flexible driving shaft will maintain a proper driving connection with the pulley 80 for all adjustments of the carrier pipe without in any way cramping said flexible shaft.

While I have referred to the coupling between the flexible shaft and the driving wheel at the upper end of the shaft as similar to that at the lower end thereof, I have substituted for the yielding lug a thumb bolt 88 which extends between collars 89 on the coupling and positively holds the sections of the coupling locked together. By the removal of this thumb bolt the sections of the coupling may be readily detached.

It will be obvious that minor changes in the details of construction and the arrangement of parts may be made without departing from the spirit of the invention as set forth in the appended claims.

Having thus fully described my invention what I claim is:—

1. A cotton picker including in combination a suction nozzle, rotating picker fingers for engaging the cotton fiber, devices for engaging the bolls and twigs for stripping the same from the rotating picking fingers, said devices being carried by the nozzle and extending outwardly from the same to points beyond the outer face of said nozzle thereby forming air inlet spaces beneath the stripping devices and underneath the bolls and twigs on said stripping devices when the same are released from the rotating fingers.

2. A cotton picker including in combination a suction nozzle having a central intake suction passage, rotating picking fingers disposed on opposite sides of said intake passages, devices for engaging the bolls and twigs for stripping the same from the rotating picking fingers, said devices being carried by the nozzle and extending outwardly from the same to points beyond the outer face of said nozzle thereby forming air inlet spaces beneath the stripping devices and underneath the bolls and twigs on said stripping devices when the same are released from the rotating fingers.

3. A cotton picker including in combination a suction nozzle having an intake suction passage, rotating picker fingers for engaging the cotton fiber and carrying the same into said intake passage, said rotating picker fingers extending beyond the picking face of the nozzle for engagement with the cotton fiber, said nozzle having means whereby a suction force is created at the picking region of said nozzle, and devices for engaging the bolls and twigs for stripping the same from the rotating picking fingers, said devices being carried by the nozzle and extending outwardly from the same to points beyond the outer face of said nozzle, thereby forming air inlet spaces beneath the stripping devices and underneath the bolls and twigs on said stripping devices thereby lessening the suction effect on the bolls and twigs prior to the disengagement of the same from the picking fingers.

4. A cotton picker including in combination, a suction nozzle having an intake passage, rotating picking fingers movable beyond the picking face of the nozzle for engaging the cotton fiber and conveying the same into said intake passage, stripper plates having slots formed therein through which said picking fingers pass, said stripper plate extending from the picking region into and forming one wall of the intake passage, said stripper plates having enlarged openings therein at the picking region, whereby the cotton fiber will be held by suction against the picking face as it is engaged by the picking fingers, and stripping fingers for engaging the bolls and twigs for stripping the same from the rotating stripping fingers, said stripping fingers being carried by the nozzle and extending outwardly from the same to points beyond the outer face of the nozzle, thereby forming air inlet faces beneath the stripping fingers and underneath the bolls and twigs on the stripping fingers when the same are released from the rotating fingers.

5. A cotton picker including a suction nozzle having a suction intake passage, rotating picking fingers projecting beyond the picking face of the nozzle for engaging the cotton fiber and conveying the same to said intake passage, stripper plates having slots formed therein through which said picking fingers pass, said stripper plates extending from the picking region into and forming one wall of the intake passage, said stripper plates having enlarged openings therein at the picking region whereby the cotton fiber will be held by strong suction against the picking face as it is engaged by the picking fingers, and stripping devices coöperating with the picking fingers for engaging the bolls and twigs and stripping the same from said rotating picking fingers, said devices being carried by the nozzle and extending outwardly from the same to points beyond the outer face of said nozzle, thereby forming air inlet spaces beneath the stripping devices and underneath the bolls and twigs on said stripping devices.

6. A cotton picker including a suction nozzle having a suction intake passage, rotating picking fingers projecting beyond the picking face of the nozzle for engaging the cotton fiber and conveying the same to said intake passage, stripper plates having slots formed therein through which said picking fingers pass, said stripper plates extending from the picking region into and forming one wall of the intake passage, said stripper plates having enlarged openings therein at the picking region whereby the cotton fiber will be held by strong suction against the picking face as it is engaged by the picking fingers, and stripping fingers coöperating with the picking fingers for moving the bolls and twigs outward away from the path of travel of the picking fingers, said stripping fingers being bent outwardly to form a space underneath the same to permit the intake of air at the picking region.

7. A cotton picker including a suction nozzle having a suction intake passage, rotating carriers on opposite sides of said passage, picking fingers mounted on said carriers, stripper plates at each side of the nozzle coöperating with the respective carriers, said stripper plates having slots formed therein for the passage of the fingers, said stripper plates having enlarged openings at the picking region, and stripping fingers at opposite sides of the nozzle which project toward the center of the nozzle and are inclined outwardly away from the nozzle so as to move the bolls and twigs outward from the nozzle, thereby decreasing the suction effect thereon and holding the same while the cotton fiber is stripped therefrom.

8. A cotton picker including a suction nozzle having a suction intake passage, rotating carriers on opposite sides of said passage, picking fingers mounted on said carriers, stripper plates at each side of the nozzle coöperating with the respective carriers, said stripper plates having slots formed therein for the passage of the fingers, said stripper plates having enlarged openings at the picking region, and stripping fingers at opposite sides of the nozzle which project toward the center of the nozzle and are inclined outwardly so as to move the bolls and twigs outward from the nozzle thereby decreasing the suction effect thereon and holding the same while the cotton fiber is stripped therefrom, said stripping fingers being bent outwardly and spaced from the nozzle adjacent the picking region to permit free access of air through the large openings in the stripper plates.

9. A cotton picker including in combination a suction nozzle having an intake passage, a rotating carrier located at one side of said intake passage, supports mounted on said carrier and projecting from the end thereof into said nozzle, picking fingers mounted on said supports, stripping devices coöperating with said fingers and means at the opposite end of the carrier from said picking fingers for positively controlling the movements of said picking fingers throughout the entire rotation of the same.

10. A cotton picker including in combination a suction nozzle having an intake passage, a rotating carrier located at one side of said intake passage, supports mounted on said carrier and projecting from the end thereof into said nozzle, picking fingers mounted on said supports, stripping devices coöperating with said fingers and means at the opposite end of the carrier from said picking fingers for positively controlling the movements of said picking fingers throughout the entire rotation of the same, and means for driving said rotating carrier including a friction rotating driving connection.

11. A cotton picker including a suction nozzle having an intake passage, a rotating carrier, supports mounted on said carrier and projecting from one end thereof into said nozzle, picking fingers fixed to said supports and stripping devices coöperating with the picking fingers, and means for oscillating said supports for swinging the picking fingers relative to the carrier to bring the same into engagement with and withdraw the fingers from engagement with the cotton fiber, said means being disposed at the opposite end of the carrier from the picker fingers and including a cam slot having cam walls for positively moving the supports in each direction and controlling the same during the entire rotation of the carrier.

12. A cotton picker including a suction nozzle having an intake passage, a rotating carrier, supports mounted on said carrier and projecting from one end thereof into said nozzle, picking fingers fixed to said supports and stripping devices coöperating with the picking fingers, means for oscillating said supports for swinging the picking fingers relative to the carrier to bring the same into engagement with and withdraw the fingers from engagement with the cotton fiber, said means being disposed at the opposite end of the carrier from the picker fingers and including a cam slot having cam walls for positively moving the supports in each direction and controlling the same during the entire rotation of the carrier, and means for rotating said carrier including a friction driving connection.

13. A cotton picker including a suction nozzle having substantially parallel walls forming a picking mouth, a rotating carrier located in one of said walls, supporting rods mounted on said carrier and projecting therefrom into the mouth of the picking nozzle, picking fingers mounted on said rods, stripping devices coöperating with said picking fingers, and means for oscillating said supporting rods including a disk having a cam groove therein, the cam walls of which positively oscillate said supporting rods back and forth and control the positions thereof during the entire rotation of said carrier.

14. A cotton picker including a suction nozzle having substantially parallel walls forming a picking mouth, a rotating carrier located in one of said walls, a bearing sleeve for said carrier, rods mounted in said carrier and projecting into said picking mouth, picking fingers fixed on said rods, each of said rods having a disk on its inner end overlying the carrier and holding the rods therein, a fixed cam overlying the bearing sleeve and secured to said casing, said disks on the rods, each having a crank pin adapted to engage a cam slot in said cam disk whereby said rods are positively oscillated in both directions, said carrier having a projecting shaft extending through an opening in said cam disk, and means connected to said shaft and coöperating with said fixed cam disk for holding the carrier in place.

15. A cotton picker including a suction nozzle having substantially parallel walls forming a picking mouth, a rotating carrier located in one of said walls, a bearing sleeve for said carrier, rods mounted in said carrier and projecting into said picking mouth, picking fingers fixed on said rods, each of said rods having a disk on its inner end overlying the carrier and holding the rods therein, a fixed cam overlying the bearing sleeve and secured to said casing, said disks on the rods, each having a crank pin adapted to engage a cam slot in said cam disk whereby said rods are positively oscillated in both directions, said carrier having a projecting shaft extending through an opening in said cam disk, and means connected to said shaft and coöperating with said fixed cam disk for holding the carrier in place, a gear connected to said shaft, and means for rotating said gear including a friction driving connection.

16. A cotton picker including a suction nozzle, a rotating carrier mounted in said nozzle, picking fingers supported by said carrier, means for positively moving said picking fingers relative to the carrier, means for rotating the carrier including a flexible shaft having a positive connection with said carrier, means disposed at the opposite end of said flexible shaft for yieldingly driving the same, said connection between the carrier and the flexible shaft including a coupling adapted to be moved endwise for disconnecting the shaft from the carrier, and yielding means for maintaining the coupling in driving connection with the carrier.

17. A cotton picker including a suction nozzle, a rotating carrier mounted in said nozzle, picking fingers supported by said carrier, means for positively moving said picking fingers relative to the carrier, means for rotating the carrier including a flexible shaft having a positive connection with said carrier, means disposed at the opposite end of said flexible shaft for yieldingly driving the same, said connection between the carrier and the flexible shaft including a coupling adapted to be moved endwise for disconnecting the shaft from the carrier, and yielding means for maintaining the coupling in driving connection with the carrier, said yielding means also supporting the coupling on the nozzle when said flexible shaft is disconnected from the carrier.

18. A cotton picking device including in combination a suction nozzle having a picking mouth, said suction nozzle being formed in sections connected together so that one may rotate relative to the other, a handle attached to the picking section, a flexible conveyer pipe attached to said nozzle, said flexible conveyer pipe being formed in sections and having a jointed connection therebetween, the jointed connection in the conveyer pipe being disposed substantially at right angles to the jointed connection in the nozzle.

19. A cotton picking device including in combination a suction nozzle, a flexible conveyer pipe attached to said nozzle, said nozzle being formed in sections and having a jointed connection permitting one section to turn on the other, a handle rigidly attached to the picking section of the nozzle, a rigid conveyer pipe, and means for connecting said flexible conveyer pipe to said rigid conveyer pipe.

20. A cotton picking device including in combination a pivotally supported carrier, a flexible conveyer pipe, a suction nozzle attached to said conveyer pipe, rotating picker fingers mounted in said nozzle, a flexible shaft for operating said fingers, said rigid carrier having a supporting head at its outer end, means for attaching said flexible conveyer to said head, a hanger loosely mounted on said head and depending therefrom, said hanger having a journaled bearing for the upper end of the flexible shaft, a driving pulley mounted on said hanger, and means for connecting said driving pullley to the flexible shaft.

21. A cotton picking device including in combination a pivotally supported carrier, a flexible conveyer pipe, a suction nozzle attached to said conveyer pipe, rotating picker fingers mounted in said nozzle, a flexible shaft for operating said fingers, said rigid carrier having a supporting head at its outer end, means for attaching said flexible conveyer to said head, a hanger loosely mounted on said head and depending therefrom, said hanger having a journaled bearing for the upper end of the flexible shaft, a driving pulley mounted on said hanger, means for connecting said driving pulley to the flexible shaft, said last named means including frictional driving surfaces, and a spring for normally holding the surfaces in contact.

22. A cotton picking device including in combination a pivotally supported carrier, a flexible conveyer pipe, a suction nozzle attached to said conveyer pipe, rotating picker fingers mounted in said nozzle, a flexible shaft for operating said fingers, said rigid carrier having a supporting head at its outer end, means for attaching said flexible conveyer to said head, a hanger loosely mounted on said head and depending therefrom, said hanger having a journaled bearing for the upper end of the flexible shaft, a driving pulley mounted on said hanger, and means for connecting said driving pulley to the flexible shaft, said last named means including a fiber disk fixed to said flexible shaft, a metal wheel mounted on the hanger and adapted to engage said fiber disk, said fiber disk and metal wheel having their axes at right angles to each other, and a second fiber disk interposed between said driving pulley and said metal wheel.

23. A cotton picking device including in combination a movable carrier, a flexible conveyer pipe supported thereby, a suction nozzle attached to said conveyer pipe and having rotating picking fingers, a flexible shaft for operating said fingers, and means supported at the outer end of said carrier so as to turn freely thereon and having devices connected to and driving said flexible shaft, said supporting means being so constructed that said flexible shaft hangs by gravity substantially in a vertical position at its upper end.

24. A cotton picker including in combination a nozzle having a suction intake passage a carrier located in said nozzle, picking fingers mounted on and movable with the carrier, strippers for removing the cotton fiber from the fingers, and means for positively controlling said fingers as they move bodily with the carrier, said means being so constructed as to move the picking portion of said fingers forward at the picking region for engaging the cotton fiber and to cause the same to stop and reverse their direction of movement at the stripping region so as to disengage the picking faces of said fingers from the cotton fiber subsequently to the moving of the picking fingers beneath the strippers.

25. A cotton picker including in combination, a nozzle having a suction intake passage, a carrier located in said nozzle, picking fingers mounted on said carrier and movable therewith, strippers for removing the cotton fiber from the fingers, and means for actuating said fingers as the carrier rotates, whereby said fingers are caused to engage the cotton fiber and carry the same forward by the advance faces of the fingers, and whereby said advance faces are disengaged from the cotton fiber prior to the withdrawing of said fingers through the strippers.

26. A cotton picker including in combination, a nozzle having a suction intake passage a carrier located in said nozzle, picking fingers mounted on and movable with said carrier, strippers for removing the cotton fiber from said fingers, and means for moving the portion of each finger engaging the cotton fiber backward for disengaging the advanced face of the finger from the cotton fiber prior to the withdrawing of said finger through the strippers.

27. A cotton picker including in combination, a nozzle having a suction intake passage a carrier located in said nozzle, picking fingers pivotally mounted on and movable with said carrier, strippers for removing the cotton fiber from said fingers, and means for swinging said picker fingers backward for disengaging said fingers from the cotton fiber prior to the withdrawing of the fingers between the strippers.

28. A cotton picker including in combination, a picking nozzle having an intake passage, picking fingers, means for supporting and moving said picking fingers whereby they are caused to project from the nozzle and engage the cotton fiber and convey the same to said intake passage, said supporting and moving means being constructed so as to move the picking fingers backward to disengage the fingers from the cotton fiber prior to the withdrawing of the fingers from the cotton fiber.

29. A cotton picker including in combination a picking nozzle having a suction intake passage, strippers extending into and forming one wall of said suction intake passage, a rotating carrier, picking fingers pivotally supported by and movable with said rotating carrier, a stationary cam adapted to positively control the position of said picking fingers, said cam being so shaped as to project said fingers from the nozzle for engaging the cotton fiber, and for swinging said fingers backward to disengage the same from the cotton fiber prior to the withdrawing of the fingers from the cotton fiber.

30. A cotton picker including in combination, a picking nozzle having a suction intake passage, a carrier, picking fingers mounted on said carrier and projecting beyond the nozzle for engaging the cotton fiber and for carrying the same to said intake passage, said nozzle having slots through which said picking fingers pass, the face of said nozzle at the picking region having an inwardly projecting portion so disposed relative to the path of movement of the picking fingers that said picking fingers are moving in the direction of travel of the cotton fiber to the intake passage when said fingers engage said cotton fiber.

In testimony whereof, I affix my signature, in the presence of two witnesses.

THEODORE E. STRAUS.

Witnesses:
  A. M. PARKINS,
  E. G. MASON.